United States Patent
Higo et al.

[11] Patent Number: 5,976,387
[45] Date of Patent: Nov. 2, 1999

[54] METHOD FOR FEEDING WASTES INTO A BOILER

[75] Inventors: Tsutomu Higo; Roberto Masahiro Serikawa, both of Kanagawa-ken; Kazuhiro Kondo, Tokyo, all of Japan

[73] Assignee: Ebara Corporation, Tokyo, Japan

[21] Appl. No.: 08/819,936

[22] Filed: Mar. 18, 1997

[30]      Foreign Application Priority Data

Mar. 19, 1996  [JP]  Japan .................................. 8-089038

[51] Int. Cl.⁶ ...................................................... C02F 1/02
[52] U.S. Cl. .......................... 210/761; 210/770; 210/919
[58] Field of Search .................................. 210/702, 710, 210/719, 757, 758, 761, 770, 790, 919

[56]          References Cited

U.S. PATENT DOCUMENTS

| | | |
|---|---|---|
| 4,657,681 | 4/1987 | Hughes et al. . |
| 5,120,448 | 6/1992 | Dorica et al. . |
| 5,188,739 | 2/1993 | Khan et al. .............................. 210/770 |
| 5,188,740 | 2/1993 | Khan . |
| 5,217,625 | 6/1993 | Khan et al. . |

FOREIGN PATENT DOCUMENTS

95/14850   6/1995   WIPO .

OTHER PUBLICATIONS

Klosky, M., "Chlorine, Sulfer, and Soluble Slag Extraction with Energy Density Improvements of a MSW Slurry," Coal Util. Full Syst. The greening Coal, pp. 205–213, 1994.
Serikawa, M.R.; Funazukuri T.; Wakao, N., "Oil Conversion of Vinasse with High–Density Water" Fuel, vol. 71, Mar., pp. 283–287.

*Primary Examiner*—Jay H. Woo
*Assistant Examiner*—Betsey J. Morrison
*Attorney, Agent, or Firm*—Wenderoth, Lind & Ponack, L.L.P.

[57]          ABSTRACT

A waste containing organic solids is fed into a boiler after it has been subjected to a hydrothermal reaction treatment in the presence of water. A slurry containing the waste is held under high-temperature and high-pressure conditions to cause a hydrothermal reaction such that an acidic slurry is formed during part of or throughout the process of the hydrothermal reaction. Thereby the content of oxygen in the waste relative to carbon atoms in building molecules of the waste is reduced. This concurrently causes removal of halogens in said building molecule and transferring the halogens into the slurry. The slurry then is cooled and dewatered and fed into a combustion section of the boiler. The waste slurry to be subjected to the hydrothermal reaction can be sorted into two portions for separate storage. One portion is a waste slurry the pH of which will increase as a result of the hydrothermal reaction. The other portion is a waste slurry the pH of which will decrease during the hydrothermal reaction. The two slurries are combined together and subjected to the hydrothermal reaction, with their relative amounts of supply being adjusted such as to form an acidic slurry either during part of or throughout the process of the hydrothermal reaction. Wastes can be supplied as a mass of high heat value into the boiler in such a manner that organic matter is transferred by a smaller amount into the aqueous phase during the hydrothermal reaction, and there is no scale deposit on the surfaces of those areas of the system components in contact with the liquid.

15 Claims, 1 Drawing Sheet

METHOD FOR FEEDING WASTES INTO A BOILER

BACKGROUND OF THE INVENTION

This invention relates to a method of feeding wastes into a boiler, more particularly, to a method of heat treatment by which municipal wastes, night soil, sewage sludge, industrial wastes and other forms of wastes that contain organic matter, are converted into a fuel in the presence of water such that it can be fed into a boiler, as well as a method by which high-moisture wastes containing halogens can be converted into a fuel for supply into a boiler.

The following is one method in the R&D stage for feeding wastes into a boiler. A solids-containing waste is finely divided and converted into a slurry, from which inorganics such as glass, tiles and pebbles, metals, etc. are removed as much as possible. If the waste is already of a fine size and need not be ground or if it is substantially free of solids as in the case of sludge or liquid waste, it may optionally be passed through a screen to remove coarse solids. Then, the slurry is pressurized, heated to a suitable temperature between 250° C. and 350° C. depending upon the type of waste and held at that temperature typically for several tens of minutes in order to cause a hydrothermal reaction. As a result, the organic matter in the waste is dehalogenated and/or deoxygenated in the form of $CO_2$ such that it is converted to carbides (generally called "char"), pitch or tar-like oil, from which an aqueous phase is removed to form a fuel.

In this method, the slurry to be pressurized is mixed with a sufficient amount of alkali to ensure that the slurry remains alkaline and will not become acidic even if it is subjected to a hydrothermal reaction. This alkali addition is performed in order to increase the yield of oil as a reaction product, and examples of the alkali commonly added include $Na_2CO_3$, NaOH and $Ca(OH)_2$. If hydrochloric acid or other strong acids are formed during the reaction, the pH of the slurry decreases so much that those parts of the reactor, e.g. heat exchangers, pipes and other system components, which are in contact with the liquid will be attacked by severe corrosion and alkalies must be added in order to prevent this problem.

Such method, however, has had the following limitations. If a hydrothermal reaction is performed in the presence of an alkali, there will be extensive production of alcohols, ketones, aldehydes, organic acids and other reaction products that are not easily separable from water. This means that as the result of treatment by the hydrothermal reaction, a substantial portion of high heat value of the feed waste is transferred into the aqueous phase and by subsequent removal of the aqueous phase from the reaction products, such portion of high heat value is lost, resulting in a lower fuel yield.

In addition, the effluent resulting from the removal of the aqueous phase has very high BOD and COD levels (>several tens of thousand ppm) and cannot be treated easily.

Further in addition, if the waste contains alkaline earth metal elements such as calcium and magnesium, the latter will enter into a precipitation reaction with sulfate and carbonates that have formed in consequence of the sulfur oxides and carbonic acid that have occurred in the hydrothermal reaction, causing scale deposition on the surfaces of those areas of the reactor, heat exchangers, pipes and other system components which are in contact with the liquid; the scale will gradually grow until operation of the system is no longer possible.

SUMMARY OF THE INVENTION

The present invention has been accomplished under these circumstances and has as an object providing a method by which wastes can be supplied as a mass of high heat value into a boiler in such a manner that organic matter is transferred by a smaller amount into the aqueous phase during a hydrothermal reaction and that there is no scale deposit on the surfaces of those areas of the system components in contact with the liquid.

This object can be attained by a method for feeding a waste containing organic solids into a boiler after the waste has been subjected to a hydrothermal reaction treatment in the presence of water, which method comprises the steps of holding a slurry containing said waste under high-temperature and high-pressure conditions to cause a hydrothermal reaction such that an acidic slurry is formed during part of or throughout the process of said hydrothermal reaction, thereby reducing the content of oxygen in said waste relative to the carbon atoms in the building molecules of said waste, concurrently causing removal of halogens in said building molecule and transferring the halogens into said slurry, then cooling said slurry, dewatering the cooled slurry and feeding the dewatered slurry into a combustion section of the boiler.

An apparatus for feeding a waste containing organic solids into a boiler includes a grinder for reducing the size of the waste in water, a filter with which an aqueous suspension of the ground waste as taken out of said grinder is freed of a certain amount of water so as to make a slurry of the waste, a storage tank for storing said waste slurry temporarily before it is subjected to a hydrothermal reaction, a reactor in which the slurry as taken out of said storage tank is subjected to a hydrothermal reaction under high-temperature and high-pressure conditions, a cooler for cooling the waste slurry which has been subjected to the hydrothermal reaction, a filter for dewatering said cooled waste slurry, and a conveyor for feeding the boiler with a fuel composed of the dewatered waste slurry.

DETAILED DESCRIPTION OF THE INVENTION

Figure 1:
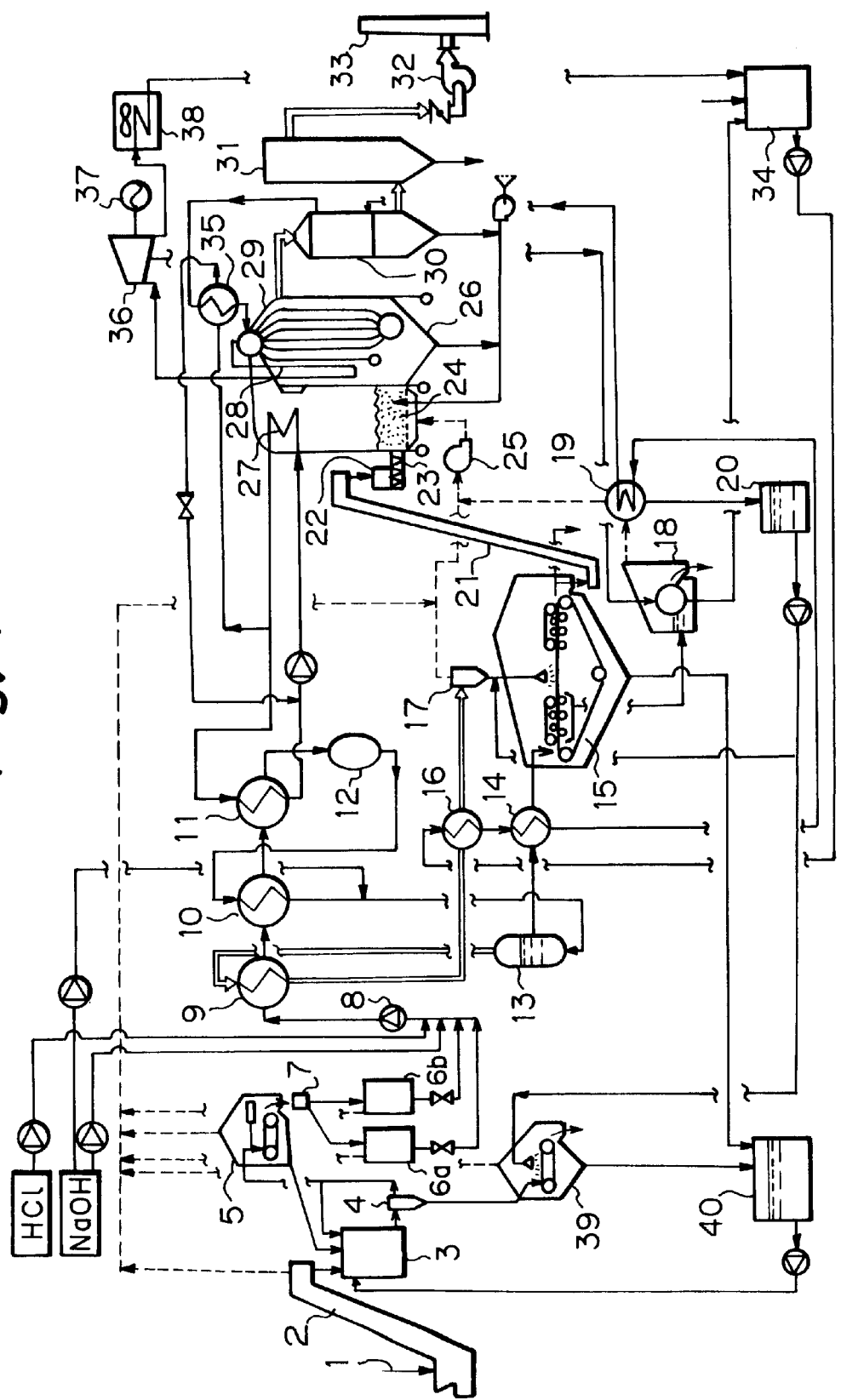
FIG. 1 is a diagram showing the general scheme for supplying a waste into a boiler according to the method of the invention.

Two experiments were conducted to perform a hydrothermal reaction, one using a waste slurry at low pH and the other at high pH, and the results of the experiments are compared in Table 1, in which the "oil content" refers collectively to those substances that are extracted with organic solvents such as dichloromethane; the "aqueous phase" refers collectively to those substances which are dissolved in the filtrate obtained by filtering the residue from extraction with organic solvents; and the "solid phase" refers collectively to those substances which remain intact after removal of the oil content and the aqueous phase.

TABLE 1

| Feed material | Alkali (Na$_2$CO$_3$) | Relative Proportions of Product, % | | | |
|---|---|---|---|---|---|
| | | oil content | gas | solid phase | aqueous phase |
| Garbage | Not added | 37 | 20 | 37 | 6 |
| Garbage | Added in 5% of dry weight | 48 | 21 | 15 | 16 |
| Garbage + paper | Not added | 41 | 16 | 33 | 10 |
| Garbage + Paper | Added in 5% of dry weight | 47 | 17 | 15 | 21 |

*Reaction conditions: 325° C. × 150 atm. × 1 h

As Table 1 shows, the yield of the oil content was reduced slightly by not adding the alkali; on the other hand, the yield of the solid phase more than doubled and that of the aqueous phase decreased to less than half.

Another experiment was conducted in order to know the effect of changing the amount of an acid to be added to the slurry before it was subjected to a hydrothermal reaction. The results are shown in Table 2.

TABLE 2

| Acid (H$_2$SO$_4$), | pH | | Relative Proportions of Product, % | | | |
|---|---|---|---|---|---|---|
| g/mL × 100 | Initial | After reaction | Oil content | gas | Solid phase | Aqueous phase |
| 0 | 4.6 | 6.5 | 8 | 9 | 37 | 42 |
| 0.01 | 4.5 | 6.6 | 9 | 18 | 34 | 39 |
| 0.04 | 4.5 | 6.4 | 9 | 21 | 32 | 36 |
| 0.10 | 4.3 | 6.4 | 9 | 18 | 33 | 38 |
| 0.40 | 4.0 | 6.1 | 9 | 14 | 34 | 41 |
| 1.00 | 3.0 | 5.0 | 9 | 11 | 33 | 47 |

*Feed material: Liquid waste from distillation of ethanol produced by fermentation of sugar cane.
Reaction conditions: 325° C. × 150 atm. × 1 h As Table 2 shows, the amount of the aqueous phase decreased until the pH was allowed to decrease to a certain point (4.3 before the reaction and 6.4 after the reaction) by addition of the acid to the slurry before the reaction; beyond that point, the amount of the aqueous phase increased, thus making the addition of further acid excessive. These results show that at a pH of about 4–6, the amount of the aqueous phase can be reduced sufficiently to increase the yields of substances effective as a fuel mixture.

It should be noted that the oil content mostly includes pitch-like solids at ordinary temperature. Therefore, by changing the nature of the slurry from alkalinity to acidity, the yield of the feed to a boiler that can be obtained by removing the aqueous phase from the slurry after the reaction is increased to a much higher level than has been possible in the prior art and the BOD and COD levels in the removed aqueous phase are reduced markedly.

Before the hydrothermal reaction, the slurry was in the form of a coloid because oxygen atoms and hydroxyl groups in the molecules contributed to attracting molecules of water; however, such a molecular structure is disrupted during the reaction, thereby transforming the slurry to a form of extremely high settleability, namely, a slurry that can be dewatered most efficiently. Further improvements in settleability and dewatering property can be accomplished by adjusting the slurry to weak alkalinity in a pH range of 8–9 after the reaction.

Any halogens that are contained in compounds in the waste start to leave them at temperatures of about 250° C. This leaving activity will not proceed smoothly in an oxidizing atmosphere, but in the method of the present invention which does not involve oxygen blowing, a strong reducing atmosphere predominates to provide a favorable condition for the progress of a dehalogenation reaction.

The hydrothermal reaction is diverse and the pH also changes in various ways during the reaction depending upon the type of the feed to be treated. In the case of a waste slurry that contains a halogen compound such as poly (vinyl chloride), the halogen is transferred into the aqueous phase to be ionized, causing a marked drop in pH. On the other hand, in the case of a waste slurry containing proteins and urea-derivated plastics, the pH will increase due to the formation of ammonium ions and amino groups.

Therefore, the ideal operation is such that the waste to be treated is separated into two types for storage, one which will cause a drop in pH as a result of the hydrothermal reaction and the other which will cause an increase in pH, and the two types of waste are subjected to the hydrothermal reaction as they are mixed in a ratio that is varied in accordance with the desired pH of the reaction products such that the pH of the waste slurry is maintained in a weakly acidic condition (pH ca. 3–5) throughout the progress of the hydrothermal reaction. At a pH above 6, the effectiveness of allowing the reaction to proceed under an acidic condition is reduced. On the other hand, if the waste slurry is held in a strong acidic condition, the solid phase will decrease whereas the liquid phase will increase as shown in Table 2 and, what is more, it becomes necessary to employ an acid-resistant high-quality metallic material in those parts of the reactor, e.g. heat exchangers, pipes and other system components, which are in contact with the liquid, leading to increased construction and maintenance costs. It should be noted that if there is a great imbalance between the proportions of the two types of waste, one which will experience a decrease in pH during the hydrothermal reaction and the other which will experience a increase in pH, an alkali such as sodium hydroxide, potassium hydroxide, sodium carbonate or potassium carbonate, or an acid such as hydrochloric acid or sulfuric acid may be added as a pH adjuster.

In the method of the invention, the reaction products are acidic enough to prevent the precipitation of sulfates or carbonates of alkaline earth metal elements such as calcium and magnesium and, hence, there is little formation of scale which has been a problem in the prior art. The acidic nature of the waste slurry also has the advantage of causing most of the salts in the waste to dissolve in the aqueous phase. In addition, substantial portions of heavy metals such as Pb, Cd, Zn and As will be transferred into the aqueous phase under the acidic condition of the waste slurry.

As a result of the hydrothermal reaction in the acidic condition, the organic matter in the waste selectively releases oxygen from its building molecules to turn into friable carbides, some of which have a higher degree of carbonization. Hence, the reaction products are preferably burnt in a boiler having a fluidized bed or divided into a fine size in a liquid to form a coal-oil mixture (COM) or a coal-water mixture (CWM) which are subsequently stored, transported or burnt.

For burning in a boiler having a fluidized bed, free water is removed from the slurry and the still moist product emerging from the dewatering step is charged into the furnace. The charged product which is in the form of clumps due to the moisture it holds will get into the fluidized bed without being blown off by the gas in the furnace, but it remains within the fluidized bed and continuously is scraped by the fluidizing medium starting on the surface until it catches fire to undergo combustion. Therefore, the efficiency of combustion in the boiler is high and may be further enhanced by practicing so-called "ash return", in which the ash precipitated or collected in the bottom of the boiler or the flue is returned to the fluidized bed.

The invention will now be described in greater detail by reference to FIG. 1, which shows the general scheme for the method of supplying a waste into a boiler by the method of the invention. A waste 1 containing organic solids is transported on a charging conveyor 2 to be charged into a wet grinder 3. The conveyor speed is adjusted such that the waste 1 is charged at a rate to ensure that an aqueous suspension in the wet grinder 3 will contain the ground waste at a concentration that is as constant as possible. The waste is ground into fine particles of a few millimeters in the wet grinder 3, from which they emerge and enter a foreign matter separator 4, where sand and metals are separated by inertia. The waste slurry is supplied onto a coarse belt filter 5 with an appropriate setting of the distance between the filter head and the position in which the waste slurry is supplied. The waste slurry is adjusted to an appropriate water content as it is transported on the belt filter 5. The adjusted water content should be within such a range that there will be no problem with the handling of the slurry. Then, the slurry is stored in tanks, e.g. tanks 6a, 6b. The filtrate from the belt filter 5 will flow back into the wet grinder 3. In the case shown in FIG. 1, part of the aqueous suspension of the ground waste emerging from the foreign matter separator 4 is returned into the wet grinder 3 so as to prevent a drop in the rate of the slurry flowing through the separator 4, thereby ensuring that the latter will exhibit the intended performance in inertial separation.

The tanks consist of a first or alkali tank 6a for storing waste slurry the pH of which will increase as a result of the hydrothermal reaction and a second or acid tank 6b for storing the slurry the pH of which will decrease during the hydrothermal reaction. Selection between the two tanks is made by means of a switching chute 7 such that slurry originating from a waste of high contents of proteins and garbage is retained in the alkali tank 6a whereas slurry originating from a waste of high content of scrap plastics is retained in the acid tank 6b.

The waste slurry from the tanks 6a, 6b is pressurized to about 170 atmospheres by means of a high-pressure pump 8 and passed through successive heat exchangers 9, 10 and 11; in the heat exchanger 9, the slurry is subjected to heat exchange with flash vapor; in the next heat exchanger 10, the slurry is subjected to heat exchange with waste slurry that has undergone the hydrothermal reaction; in the final heat exchanger 11, the slurry is subjected to heat exchange with a heating medium so that it is heated to a temperature of about 325° C. The thus heated slurry is then fed into a hydrothermal reactor 12, where it is held at the same temperature for several tens of minutes. The liquid pressure in the reactor 12 is held higher than the vapor pressure at the retained temperature so as to prevent the slurry from boiling. The temperature of the heating medium is controlled to be such that the temperature of the waste slurry within the reactor 12 will reach a predetermined setting.

The opening of the valves on the tanks 6a and 6b through which the respective types of waste slurry are supplied are adjusted in such a way that the pH of the slurry at the exit of the reactor 12 will be in the weak acidic range of 3–5. If the control of the valve openings is not completely effective or in the case where the tank of the slurry which needs to be supplied in order to adjust the pH to be within the stated range has become empty, hydrochloric acid or sodium hydroxide shall be injected into the slurry emerging from that tank. Before performing degassing and cooling in a flash tank 13 to be described below, sodium hydroxide is injected into the waste slurry that has been subjected to the hydrothermal reaction, thereby adjusting the pH of the slurry to about 8. At least in the case of performing cooling within the heat exchanger 10, the pH of the waste slurry should be adjusted to be within the weak acidic range of about 3–5 so as to prevent scaling in the high-temperature and high-pressure areas.

After the hydrothermal reaction, the waste slurry is returned to the heat exchanger 10, where it is subjected to heat exchange with the slurry which is yet to be subjected to the reaction; the slurry then leaves the heat exchanger 10 to enter the flash tank 13, where it is rapidly depressurized to cause evaporation of water and simultaneous cooling, whereupon gases such as nitrogen, carbon dioxide, methylmercaptan hydrogen sulfide which are contained in the waste are separated together with the vapor which has been generated as the result of depressurization. This step may be a single-stage or a multiple-stage step, in which a plurality of heat exchangers 9 for performing heat exchange between the waste slurry to be subjected to the reaction and the flash vapor are respectively combined with a corresponding number of flash tanks 13 for flashing the waste slurry that has been subjected to the reaction and the individual combinations are connected in series to ensure that degassing is performed more thoroughly and that the waste slurry to be subjected to the reaction will be heated to an even higher temperature by means of the flash vapor. It should be noted that since the waste slurry which has been subjected to the reaction was already neutralized to weak alkalinity before it was flashed, the flash vapor will not contain hydrochloric acid but may occasionally contain ammonia gas.

The waste slurry that has been cooled to 100° C. by flashing after the reaction then enters a heat exchanger 14, where it is further cooled by heat exchange with boiler feedwater. The cooled slurry is passed through a belt filter 15 to have the aqueous phase squeezed off and washed with water formed by condensing the flash vapor with the boiler feedwater in a heat exchanger 16 and which has been separated from the vapor by means of a gas-liquid separator 17; the washed slurry is dewatered again by means of the belt filter 15. The aqueous phase squeezed off the slurry is fed into a drum-type dryer 18, where it is evaporated to dryness with a vapor to turn into a salt. The exhaust from the dryer 18 is supplied to a cooler 19, where it is cooled with the boiler feedwater to yield drain water, which is collected in a tank 20 for subsequent use on the belt filter 15 to wash the waste slurry which has been subjected to the reaction, as well as to wash foreign matter that will be removed in a foreign matter separator 39. A liquid waste 40 that results from the final washing is returned to the wet grinder 3. It should also be noted that the oil content resulting from dewatering with the belt filter 15 is smaller in quantity than the solid phase including char and mostly composed of a heavy fractions which will solidify into a pitch-like mass at a temperature below 30–50° C.; hence, upon cooling, the oil content is accompanied by the solid phase through adsorption and can be easily separated from the aqueous phase together with the solid phase.

A raw fuel composed of the resulting oil-containing solid phase is transported by a boiler charging conveyor 21 and dumped into a feeder hopper 22, from which it is passed through a feeder 23 to be charged into a fluidized bed 24 for combustion. In order to prevent the production of malodor, the cooled exhaust gas in the flash vapor, the cooled exhaust gas from the drum-type dryer 18 and the ventilation from the wet grinder 3 are supplied as boiler combustion air into boiler 26 via a forced-draft fan 25, whereby any odor-producing components will be decomposed by oxidation. A tube 27 for heating the heating medium is inserted into the furnace in the boiler and by controlling the rate at which the heating medium to be subjected to heat exchange with the boiler feedwater in the heat exchanger 35 will flow through such heat exchanger, the radiation of heat from the heating medium is controlled so as to adjust its temperature.

The exhaust combustion gas from the fluidized bed 24 is heat recovered by means of a superheater 28 and a group of heat transfer pipes in a boiler bank 29, cooled with an economizer 30, has the dust collected by means of a bag filter 31 and passed through an induced draft fan 32 to be discharged from a stack 33. The boiler feedwater is preheated with the waste slurry in the heat exchanger 14 after it has been subjected to the reaction, with the flash vapor in the heat exchanger 16 and by cooling the exhaust from the drum-type dryer 18 in the cooler 19. The preheated boiler feedwater then passes through the economizer 30 to be subjected to heat exchange with the heating medium in the heat exchanger 35 and thereafter enters the boiler bank 29. The vapor generated in the boiler bank 29 is heated in the super heater 28, supplied into a bleeder turbine 36 to drive a generator 37, condensed into water in a condenser 38 such that it returns to a boiler feedwater tank 34. The steam drawn from the bleeder turbine 36 causes the aqueous phase to evaporate thus to become dry in the drum-type dryer 18, whereupon it is condensed into water which will flow back to the boiler feedwater tank 34.

If the raw fuel is in an amount more than necessary in the boiler, the excess amount is not fed into the boiler but either is withdrawn for storage or transported for use as a fuel in another boiler. Converting the excess fuel into COM or CWM by means of a wet grinder is preferred for handling in the storing or transporting operation.

All of the ash contained in the raw fuel will accompany the exhaust combustion gas from the furnace and is collected with a bag filter for subsequent discharge to the ambient atmosphere. The ash settling in the flue as on the bottom of the boiler or in the lower part of the economizer is transported pneumatically by means of a pneumatic blower and returned as "return ash" from the bottom of the fluidized bed to the top. This allows almost all of the unburnt carbon in the return ash to be burnt up, thereby increasing the efficiency of combustion.

It should be remembered that the present invention is by no means limited to the embodiment shown in FIG. 1.

As described on the foregoing pages, the method of the present invention accepts all kinds of municipal and industrial wastes irrespective of whether they are a solid, a sludge of liquid form and performs a hydrothermal reaction to achieve dehalogenation of the wastes while dewatering them to increase their heat value such that they can be fed into a boiler for combustion with high efficiency. The method has the additional advantage of reducing the contents of heavy metals in the waste slurry.

The yield in the hydrothermal reaction is markedly improved over what has been achieved in the prior art, whereas the BOD and COD levels in the resulting effluent are significantly reduced. The invention also eliminates scaling in high-temperature and high-pressure areas which has been a problem with continued operation for an extended period of time. Hence, the process contemplated by the invention which was at the R&D stage before the accomplishment of the invention has been advanced to a commercially feasible level.

Unlike in the case of burning wastes directly in a boiler, the invention method reduces the moisture content of the wastes so as to reduce the exhaust gas from the boiler; in addition, any foreign matter is sufficiently removed to prevent the formation of incombustible items on the bottom of the furnace, and there will be no problem of corrosion by halogen compounds. Further in addition, if raw fuel is processed into a COM or CWM which is comparable to a liquid fuel, it can be burnt together with conventional liquid fuels, and this contributes to enhancing the efficiency of power generation with a turbine by producing high-temperature and high-pressure vapor while eliminating the need to equip the boiler with facilities for handling solids and withdrawing incombustible items from the bottom of the furnace, thereby helping realize a compact, highly efficient, inexpensive but highly reliable boiler. As a further advantage, the combustion-induced generation of organohalogen compounds typified by extremely toxic dioxins can be suppressed while, at the same time, the content of heavy metals in the ash can be reduced.

Thus, the invention makes a great contribution to increasing the efficiency of the heat cycle of wastes.

What is claimed is:

1. A method of treating wastes, said method comprising:
    producing from said wastes a feed slurry having a composition based on said wastes and including halogen atoms;
    subjecting said feed slurry to a hydrothermal reaction by holding said feed slurry at elevated temperature and pressure conditions, and thereby dissolving said halogen atoms in said feed slurry to produce an acidified slurry containing halide ions; and
    said producing including adjusting said composition of said feed slurry to ensure that said acidified slurry produced by said hydrothermal reaction has a pH ranging from about 3 to about 5.

2. A method as claimed in claim 1, further comprising cooling said acidified slurry to form a cooled slurry.

3. A method as claimed in claim 2, further comprising dewatering said cooled slurry to form a dewatered slurry.

4. A method as claimed in claim 3, further comprising feeding said dewatered slurry into a combustion sector of a boiler.

5. A method as claimed in claim 1, further comprising feeding said acidified slurry into a combustion sector of a boiler.

6. A method as claimed in claim 1, wherein said producing comprises producing a first waste slurry having a first composition having a pH that increases upon conducting said hydrothermal reaction, and producing a second waste slurry having a second composition having a pH that decreases upon conducting said hydrothermal reaction, and said adjusting comprises combining said first waste slurry and said second waste slurry to produce said feed slurry in proportions suitable to ensure that said acidified slurry has said pH ranging from about 3 to about 5.

7. A method as claimed in claim 6, wherein said first composition contains protein.

8. A method as claimed in claim 6, wherein said first composition contains urea-derived plastic.

9. A method as claimed in claim 6, wherein said second composition contains plastic material.

10. A method as claimed in claim 6, wherein said second composition contains polyvinylchloride.

11. A method as claimed in claim 1, wherein said adjusting comprises adding acid to said feed slurry.

12. A method as claimed in claim 1, wherein said adjusting comprises adding alkali to said feed slurry.

13. A method as claimed in claim 1, further comprising heating said feed slurry prior to said holding.

14. A method as claimed in claim 1, wherein said wastes comprise solid wastes, and said producing further includes grinding said solid wastes in water to form an aqueous suspension of ground waste, and removing water from said aqueous suspension.

15. A method as claimed in claim 1, further comprising adding alkali to said acidified slurry to produce a slurry having a pH ranging from about 8 to about 9.

* * * * *